United States Patent Office 3,273,629
Patented Sept. 20, 1966

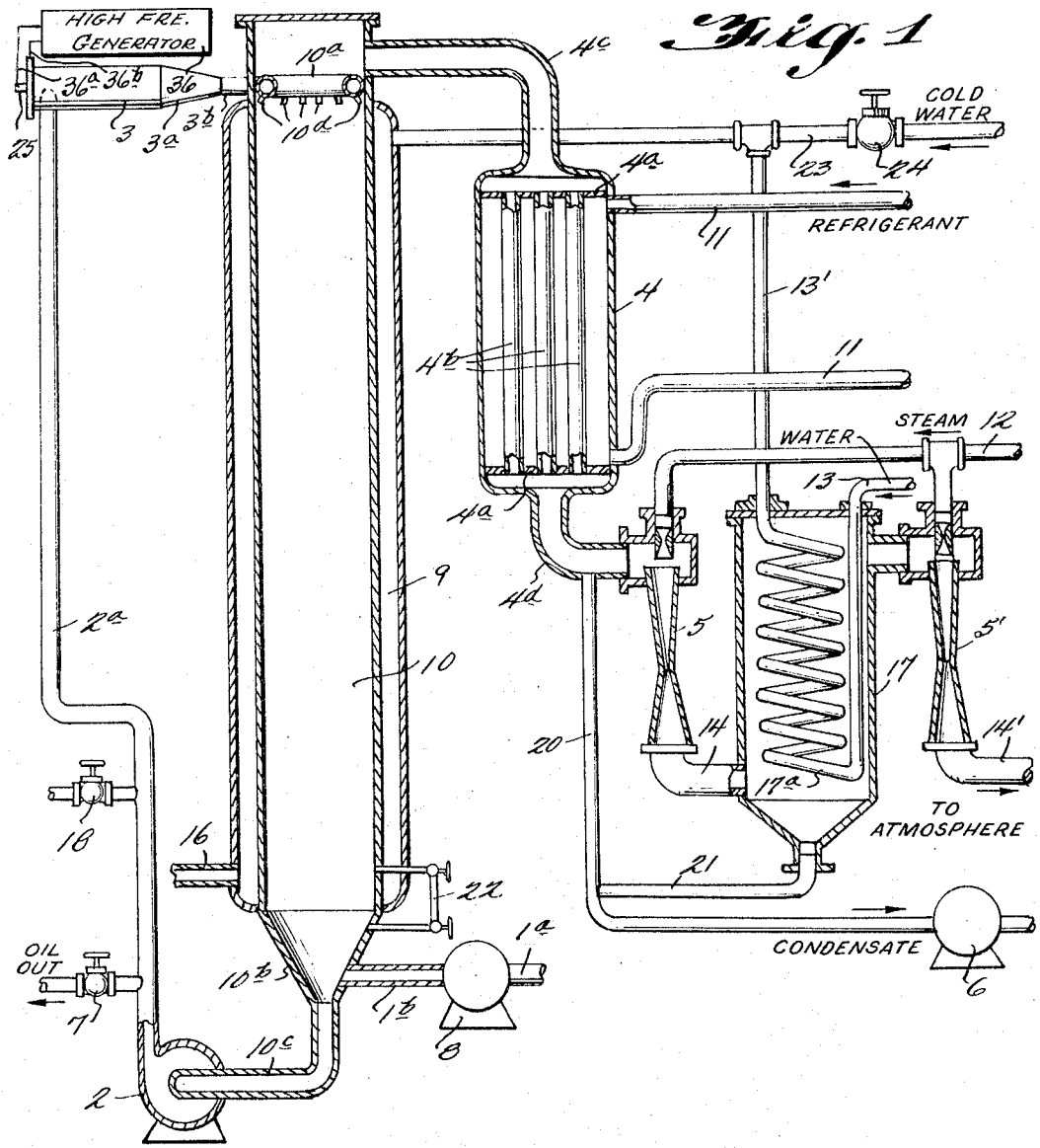

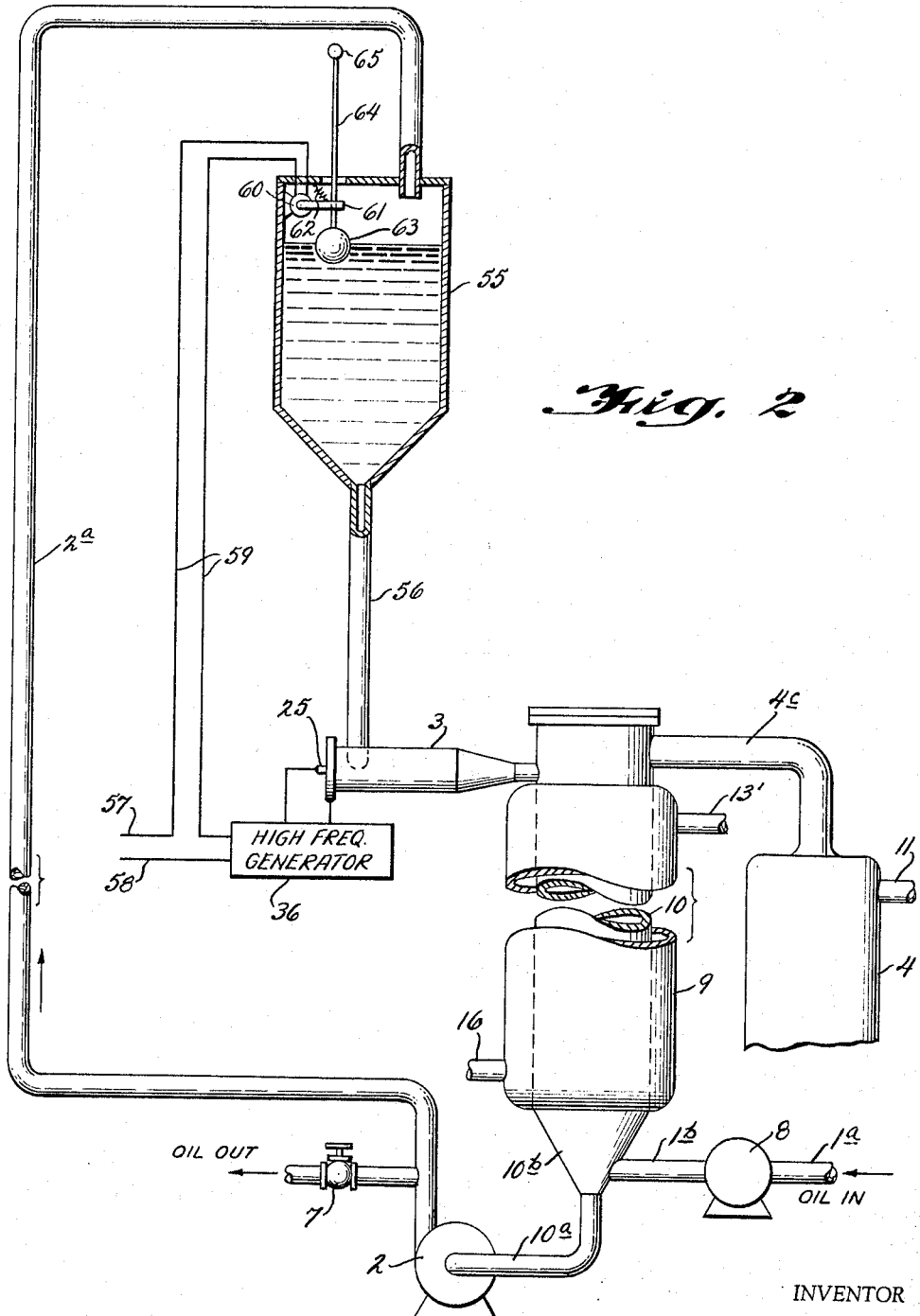

3,273,629
METHOD AND APPARATUS FOR REMOVING WATER FROM FUEL AND OTHER OILS
Ralph G. Sargeant, Lakeland, Fla., assignor to Pet Milk Company, St. Louis, Mo., a corporation of Delaware
Application May 24, 1962, Ser. No. 198,687, now Patent No. 3,209,812, dated Oct. 5, 1965, which is a division of application Ser. No. 841,478, Sept. 22, 1959, now Patent No. 3,072,490, dated Jan. 8, 1963. Divided and this application Nov. 6, 1964, Ser. No. 416,176
4 Claims. (Cl. 159—3)

The present application is a division of my prior copending application Serial No. 198,687, filed May 24, 1962, now Patent No. 3,209,812, which application is itself a division of my application Serial No. 841,478, filed September 22, 1959, now Patent No. 3,072,490, issued January 8, 1963, which is a continuation-in-part of my prior copending application Serial No. 482,056, filed January 17, 1955, which application itself was a continuation-in-part of prior application Serial No. 430,048, filed May 17, 1954, the earlier two of which are now abandoned.

This invention relates to a method of and apparatus for removing water by evaporation from liquid mixtures containing water and other components. It is particularly advantageous for the removal from hydrocarbon and other oils and liquid fuels of any water which may have become mixed therewith.

As set forth in said prior patent, the present invention is based on the use of so-called "dielectric heating," that is to say the application to the liquid being treated of very high-frequency electric oscillations, having a frequency, for example, on the order of 10 to 20 megacycles, more or less.

The rate at which heat is generated in dielectric heating depends upon the "loss factor," a factor which is directly proportional to what is known as the "dielectric constant" of the material. Dielectric constants vary from 1 to 8, for most materials ordinarily associated with water, but water has a dielectric constant of about 80. Thus, the dielectric constant of water is from ten to eighty times greater than that of any other material with which water is usually mixed, and therefore water, when subjected to a high-frequency field, heats at a much more rapid rate than any other such substance or material.

One object of the invention is to devise an improved method of removing all traces of water from hydrocarbon and other oils by means of high-frequency electrical energy.

Another object is to provide means for eliminating the hazard of explosion, when the method is applied to volatile, inflammable liquids such as gasoline.

In order that the invention may be readily understood, reference is had to the accompanying drawing, forming part of this specification, in which:

FIG. 1 is a schematic view of the equipment used in carrying out one form of the invention; and FIG. 2 is a similar view of a modified arrangement especially adapted for handling inflammable liquids.

Referring to the drawings in detail, the liquid to be treated is drawn in by a pump 8 through pipe 1a, and delivered through pipe 1b to the conical bottom 10b of an evaporating chamber 10.

From the lower end of the conical bottom 10b extends a pipe 10c to a centrifugal pump 2 which forces the liquid material up through a vertical pipe 2a to the top of the evaporating chamber 10 where it is delivered to a spray head 10a which directs the material into contact with the vertical walls of the evaporating chamber. The material then flows down these walls to the conical bottom 10b where it is again recirculated or recycled by the pump 2.

The preferred construction of the spray head is shown in FIG. 1. It consists of an annular or ring-shaped pipe having a series of nozzles 10d projecting outwardly and downwardly from its lower side, so as to spray the liquid against the walls of the chamber.

Interposed in the pipe 2a is a dielectric heating device or electrode structure 3 through which the liquids circulate. The details of the preferred form of this device are shown in FIG. 3 to 5 of my above-identified patent. It consists of a horizontally disposed cylindrical casing or shell having a restricted or tapering end 3a, discharging axially of the casing into a pipe 3b connected with the spray head 10a. Mounted at the other end of the cylindrical structure and extending axially thereof is a central electrode in the form of a rod 25, so that an annular space is provided between this rod and the cylindrical shell. This central electrode, which is shorter than the cylindrical shell, is supported wholly at one end, the other end, adjacent the discharge opening of the shell, being free. The pipe 2a, which feeds the liquid into the electrode structure, is arranged to deliver the same tangentially into the cylindrical shell adjacent the end at which the electrode rod is mounted, so that the liquid tends to whirl around the annular space as it travels toward the discharge end of the shell. This whirling or spiral movement of the liquid tends to prevent deposits on the inner surface of the cylindrical shell and keep such surface clean.

It will be understood that the oil and water mixture flows through the electrode structure in the form of a solid, confined stream. Where, in the appended claims, I use the word "solid" in describing the nature of the stream, I mean that the stream is continuous and unbroken, and completely fills the annular passageway within the electrode structure.

In use, the electrode structure is connected with the two sides of a high-frequency generator 36, one side being connected through a well insulated lead 36a with the central rod 25, and the other side connected by lead 36b with the electrode shell or casing, which is grounded. The water-free oil may be withdrawn through valve 7.

From the top of the evaporating chamber 10 extends a pipe 4c to a condenser 4 of any suitable type shown as a shell and tube condenser having tube sheets or bulk heads 4a adjacent each end, between which extends tube 4b.

A pipe 4d extends from the bottom of the condenser 4 to a steam-operated air ejector 5, supplied with steam through a pipe 12. This ejector draws the vapors from the evaporating chamber down through the tubes of the condenser 4, and the steam and vapors are delivered from the ejector 5 through a pipe 14 into an intercondenser 17. A second air ejector 5' draws the uncondensed steam and vapors from the condenser 17 and discharges through pipe 14' to atmosphere.

To eliminate the costly construction required with a barometric condenser such as is commonly used for this purpose, I employ a surface-type condenser, containing a coil 17a. Water is fed to one end of this coil by a pipe 13, and from the other end extends a pipe 13' to a jacket 9 which surrounds the evaporating chamber 10. Thus, the water which is heated in the coil 17a by the steam and vapors from the air ejector 5 is utilized to transfer this heat to the walls of the evaporating chamber 10. In the case of removing water from oils, this water jacket may or may not be used, according to circumstances.

A pipe 23, controlled by a valve 24, is connected with pipe 13', and through this pipe 23 cold water may be admitted to regulate the temperature of the jacket 9 as desired.

By way of example, it may be stated that by means of the air ejector above described, a vacuum is maintained on the evaporating chamber to an extent of at least 29½ inches, so that the water contained in the liquid mixture being treated evaporates at about 70° F. In order to observe the level of the liquid in the evaporating chamber, a sight glass 22 is preferably provided adjacent the bottom thereof.

A suitable refrigerating medium such as "Freon" gas is supplied to the condenser 4 by pipes 11, from a suitable compressor, in a well-known manner, this apparatus being so designed as to maintain the condenser 4 at a temperature of approximately 50° F. Thus, the vapors coming off through pipe 4c are mostly condensed, and the condensate flows out from the bottom of the condenser through pipe 20 to a pump 6. A pipe 21 from the bottom of condenser 17 delivers additional condensate into the pipe 20.

Referring again to FIG. 1, the pipe 2a is slightly larger than the restricted outlet 3b discharging the liquid from the electrode structure, so that the pump 2 tends to generate and maintain a substantial pressure within the electrode structure, such as 50 to 60 lbs. per square inch. Thus, the high-frequency electrical energy is applied to the liquid mixture while it is under substantial hydraulic pressure.

Furthermore, the sum total of the cross-sectional areas of the spray nozzles 10b is preferably somewhat greater than the cross-sectional area of the restricted discharge 3b, with the result that the pressure in the spray head 10a is somewhat less than in the electrode structure.

The high-frequency generator 36 which I employ is of the well-known type embodying one or more oscillating thermionic tubes. The exact frequency is not critical, but should be what is known as radio frequency. For example, a frequency of 60 cycles per second, such as ordinary house current, would not be high enough to produce the desired results. Furthermore, with such a low-frequency current, electrolysis is likely to occur at the inner electrode. It is thought that a frequency of anywhere within the range of 1 to 25 or more megacycles will operate satisfactorily. In practice, I have usually employed a frequency on the order of 15 to 20 megacycles.

When removing water from hydrocarbon or other liquid fuels or other oils and the like, it is believed that the water is actually heated by the high-frequency electrical energy, and, because of the fact that, as hereinbefore stated, water has a loss factor or "dielectric constant" many times greater than any other known substance, it is heated first, and heated much more rapidly than the other components. The water particles are heated to a temperature such that they will vaporize at the low pressure existing in the evaporating chamber.

Because the percentage of water usually contained in liquid fuels, for example, is small, and because the liquid is flowing through the electrode structure at a high rate of speed, it is thought that the small amount of water thus heated does not have time to impart any substantial degree of heat to the liquid mass. Consequently, when the mixture reaches the spray head in the vacuum chamber, the heated water flashes into vapor and is drawn off and condensed, while the liquid fuel itself does not vaporize.

In any event, tests have shown that, with my improved apparatus, the water is effectively and completely removed from the liquid fuel.

As is well known, it is impossible to prevent some leakage of air, at times, into rotary pumps of the type herein disclosed, due to wear of the packing gland around the shaft, and this air, of course, becomes mixed with the liquid being pumped.

In the case of highly inflammable liquids such as hydrocarbon fuels, the presence of even minute quantities of air constitutes a serious hazard, since the liquid, mixed with such air, is delivered under pressure, as above described, into the electrode structure, where it is subjected to high-frequency, high-voltage, electrical energy. Under these circumstances, it is quite conceivable that an explosion might occur.

To completely eliminate this hazard, I employ the arrangement illustrated in FIG. 2. In this figure, there is shown an elevated, vented gravity tank 55 into which the pipe 2a from the circulating pump 2 delivers, instead of into the top of the evaporating chamber, as in FIG. 1. This tank 55 is connected with the electrode structure 3 by a pipe 56, and the height of the tank above the electrode structure determines the hydrostatic pressure under whihc the liquid is delivered into it. Any air which may be admixed with the liquid delivered through the pipe 2a into the tank rises to the surface of the liquid in the tank and escapes, thus providing a mass of liquid in the tank substantially free from air. This air-free liquid is then fed directly by gravity into the electrode structure. The upper level of liquid in the tank may be limited by a float operating a switch controlling the supply of current to the motor driving the pump 2, such an arrangement being common and well known, and hence not shown.

In order, however, to prevent the possibility of trouble in case the liquid level in the tank falls so low that air may be drawn into the pipe 56, I preferably provide means for automatically shutting off the power to the high-frequency generator in this event. I have illustrated power supply leads 57, 58, connected with the high-frequency generator, and one of these leads, as 57, is carried up to the top of the tank 55, as indicated at 59, and connected with a suitable switch 60. This switch is shown as provided with an operating arm 61, biased to closed position as by means of a spring 62. A float 63 is carried at the lower end of a rod 64, sliding freely through an opening in the arm 61, and having secured to its upper end a knob 65 which cannot pass through this opening.

The operation is obvious. If the liquid level falls so low that, as the float descends, the knob 65 engages the arm 61, the weight of the float will operate to swing the arm downwardly, against the tension of the spring 62, and thus open the switch, cutting off power to the high-frequency generator. Then, when the level is restored to a safe point, the float will rise, permitting the spring to again close the switch and render the generator operative.

What I claim is:

1. The method of removing relatively small percentages of water from oils which comprises freeing the oil and water mixture from any air which it may contain, flowing the air free oil and water mixture as a solid, confined stream under substantial hydraulic pressure; applying high-frequency electrical energy to the flowing liquid, while under such pressure; then discharging the mixture into a flash evaporation zone while maintaining said zone under high vacuum and at such temperature as to cause the water content only of the mixture to flash into vapor, and separately withdrawing the water-free oil from said evaporating zone.

2. The method of removing relatively small percentages of water from oils which comprises flowing the oil and water mixture as a solid, confined stream under substantial hydraulic pressure; applying to the flowing streams while under such pressure, high-frequency electrical energy, to selectively raise the temperature of the water present, but not the oil, then discharging the mixture into a flash evaporation zone while maintaining said zone under high vacuum and at such temperature as to cause the water content only of the mixture to flash into vapor, and separately withdrawing the water-free oil from said evaporating zone.

3. Apparatus for evaporating water from liquid mixtures containing it, comprising in combination, a vacuum chamber, an electrode structure having inner and outer members spaced apart to provide an annular pasageway between them, a high-frequency generator connected with said members, means for introducing the liquid mixture into said annular passageway and mantaining it under pressure therein, said means comprising an elevated gravity tank and a pipe connecting the bottom of the vacuum chamber with the top of said elevated tank and having a pump therein for delivering liquid into the tank, said tank having vent means, whereby any air bubbles contained in the liquid delivered by said pump will rise to the top of the liquid in said tank, and escape to atmosphere, a pipe connecting the bottom of said tank with said electrode structure, and conduit means for discharging said liquid mixture from said electrode structure into said vacuum chamber.

4. Apparatus for evaporating water from liquid mixtures containing it, comprising in combination, a vacuum chamber, an electrode structure having inner and outer members spaced apart to provide an annular passageway between them, a high-frequency generator connected with said members, means for introducing the liquid mixture into said annular passageway under pressure, said means comprising an elevated gravity tank and a pipe connecting said tank with said electrode structure, a pipe for delivering the liquid mixture into said tank, means controlled by the level of liquid in said tank for cutting off the supply of electrical power to said high-frequency generator when the level falls below a predetermined minimum, and means for delivering the liquid mixture from said electrode structure into said vacuum chamber.

No references cited.

NORMAN YUDKOFF, *Primary Examiner.*

J. SOFER, *Assistant Examiner.*